Oct. 27, 1970     A. L. TROUTNER     3,535,845
PITCHED TRUSS AND RIDGE CONNECTOR THEREFOR
Filed Sept. 20, 1968     2 Sheets-Sheet 1
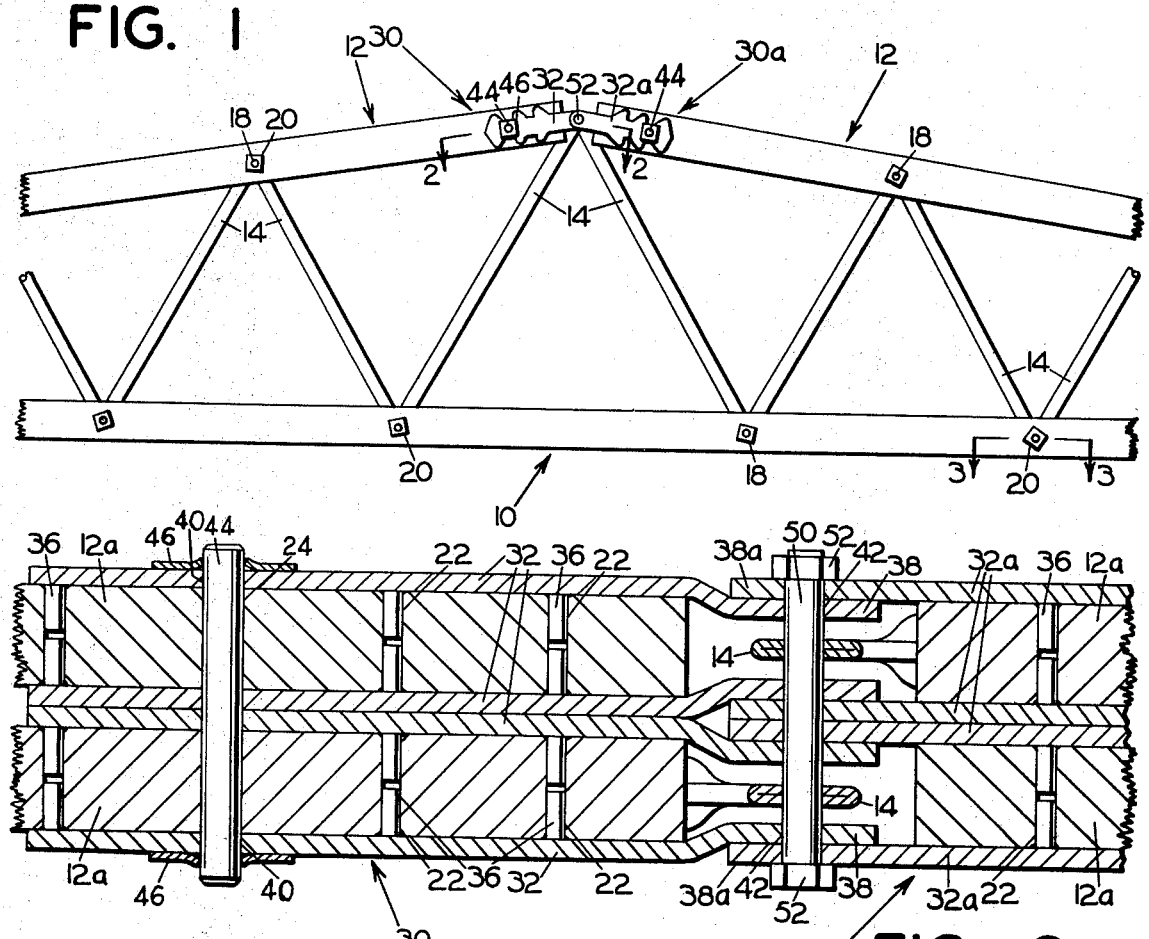
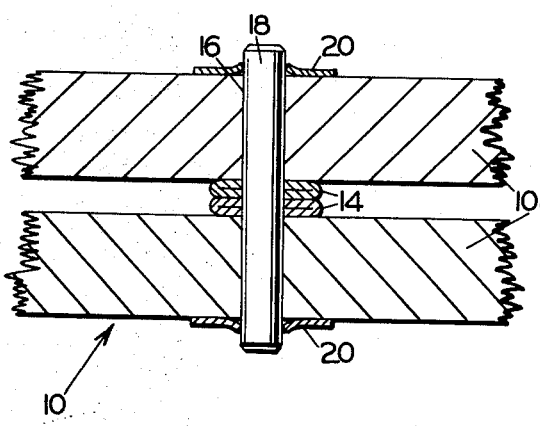
ARTHUR L. TROUTNER
INVENTOR.
BY Eugene D. Farley
ATTY.

Oct. 27, 1970    A. L. TROUTNER    3,535,845
PITCHED TRUSS AND RIDGE CONNECTOR THEREFOR
Filed Sept. 20, 1968    2 Sheets-Sheet 2

ARTHUR L. TROUTNER
INVENTOR.

BY *Eugene D. Farley*
ATTY.

United States Patent Office 3,535,845
Patented Oct. 27, 1970

3,535,845
PITCHED TRUSS AND RIDGE
CONNECTOR THEREFOR
Arthur L. Troutner, Skyline Drive,
Boise, Idaho 83702
Filed Sept. 20, 1968, Ser. No. 761,233
Int. Cl. E04c 3/11
U.S. Cl. 52—639                          8 Claims

ABSTRACT OF THE DISCLOSURE

A pitched truss comprises upper and lower chords and interconnecting web members. The upper chord includes two sections arranged end to end at a predetermined angle, forming a central ridge. The adjacent ends of the upper chord sections are spaced apart and have a predetermined pattern of transverse pin openings. A ridge connector comprises a pair of structural plates having a plurality of load distributing pins which seat in the transverse openings. The plates extend longitudinally beyond the ends of the upper chord sections in overlapped relation when the pins are seated in the pin openings. Securing means secure the plates to the upper chord sections and connecting means interconnect the overlapped ends of the plates at a predetermined ridge angle.

---

Figure 4:
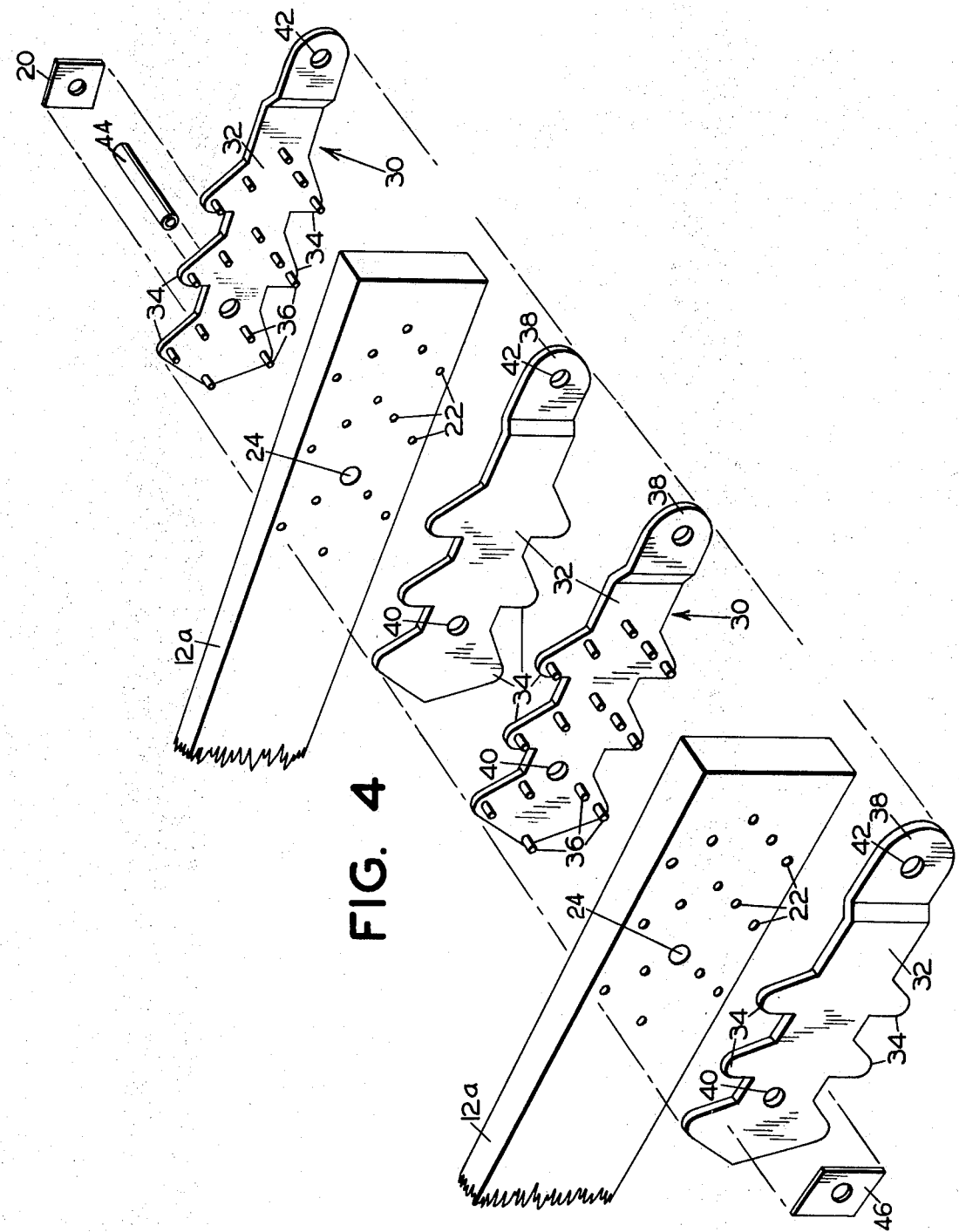

This invention relates to pitched trusses and to ridge connectors therefor.

One well known class of pitched structural trusses comprises a lower chord, a pitched upper chord including two sections arranged end to end at a predetermined angle to each other, and a plurality of web members interconnecting the upper and lower chords. The adjacent ends of the upper chord sections are coupled at a predetermined angle by means of a ridge connector.

To be suitable for this application, the ridge connector must be stable, must maintain the proper pitch, and must resist the various stresses which are applied to the truss during its manufacture, erection and use.

Accordingly it is the general object of the present invention to provide the pitched truss assembly and a ridge connector therefor which is characterized by the following functional and economic advantages:

(1) It distributes over a wide area the load applied to the truss.

(2) It resists effectively both the tension and compression forces applied to the truss.

(3) It is of adjustable angle during manufacture.

(4) It is of minimum weight and maximum strength.

(5) It maintains the proper pitch in the upper chord.

(6) It may be applied in the manufacture of pitched trusses of otherwise standard construction using conventional truss fabricating machinery.

(7) It may be used in the manufacture of trusses which are assembled rapidly without the necessity of using special equipment.

In the drawings:

FIG. 1 is a fragmentary view in elevation of a pitched structural truss of the invention including the novel ridge connector and illustrating its manner of inclusion in the truss assembly;

FIGS. 2 and 3 are fragmentary sectional views taken along lines 2—2 and 3—3 of FIG. 1, respectively; and FIG. 4 is an exploded perspective view illustrating the manner of assembly of the ridge joint of the truss, using the herein described ridge connector.

Generally stated, the presently described pitched truss assembly of the invention comprises upper and lower chord web members. The upper chord includes two sections arranged end to end at a predetermined angle, forming a central ridge. The adjacent ends of the upper chord sections are spaced apart and have a predetermined pattern of pin openings transversely therethrough.

A ridge connector comprising a pair of structural plates has a plurality of load distributing pins arranged and dimensioned to seat in the transverse openings through the upper chord section ends. The plate are dimensioned and arranged to extend longitudinally beyond the ends of the upper chord sections in overlapped relation with each other when the plate pin are seated in the upper chord section pin openings.

Securing means are provided for securing the plates to the upper chord sections and connecting means are provided for interconnecting the overlapped ends of the plates at a predetermined ridge angle of the upper chord sections.

As illustrated in FIG. 1, the herein described pitched truss comprises a lower chord 10, an upper chord including two sections 12 arranged end to end at a predetermined angle to each other with their adjacent ends spaced apart, and a plurality of interconnecting web members 14 of varying length.

Lower chord 10 and upper chord sections 12 may comprise 2 x 4's, 2 x 6's or other structural pieces placed flatwise, facing each other. Web members 14 may comprise length of steel tubing having flattened, perforated ends.

In a heavy duty construction, lower chord 10 and upper chord sections 12 each may be made up of two structural pieces placed side by side, parallel to and spaced from each other. As is shown in FIG. 3, lower chord 10 may include structural pieces 10a while upper chord sections 12 may include structural pieces 12a.

Spacing the chord members apart in this manner provides slots which are intercepted at spaced intervals by transverse cross bores 16. The truss is assembled by inserting the flattened ends of the web members into the slots in overlapped relation and inserting pins 18 through the cross bores and the aligned openings in the flattened ends of the web members. The pins are retained by suitable means such as press-on washers 20.

Straight and pitched trusses of this class are a standard item of manufacture with established manufacturing routines and efficiently designed manufacturing apparatus. The present invention provides a ridge connector for use in the manufacture of pitched trusses which improves the performance of the resulting truss and which does not require substantial modification of the mill procedure for including it in the truss assembly.

In accomplishing this purpose, the adjacent ends of upper chord sections 12a are provided with a plurality of transverse, load distributing pin openings 22, and with a transverse securing pin opening 24.

Load distributing pin openings 22 are spaced widely over the area of the chord section end in order to distribute the load efficiently.

Securing pin opening 24 is analogous to pin openings 16, hereinabove described and used for receiving a pin 18 employed in assemblying the truss.

Also, there is provided a ridge connector, the construction and manner of application of which are shown particularly in FIG. 4.

The connector includes at least one pair, preferably several pairs, of plate elements 30. In the illustrated form of the invention there are four such pairs, one pair being applied to each of the component pieces of each of the upper chord section adjacent ends, thereby lending great strength to the assembly.

Each of plate elements 30 includes an elongated body section 32 having one or more lateral extensions 34 to give an overall width which approximates the width of chord component 12a.

Extending laterally outwardly from the inner face of plate 30 are a plurality of pins 36. The diameter of the pins is such that they fit snugly within opening 22 through the upper chord section components. Their length is such that they extend substantially half way through the components, as shown in FIG. 2.

Plate 32 further is provided with an extension 38 which projects outwardly beyond the end of the chord section component, and which is offset inwardly by an amount sufficient to provide a recess between the two central plates and a clearance on the outside of the two outermost plates. The purpose of the recess and clearance is to accommodate the outwardly projecting portions 38a of companion plates 30a secured to the companion chord sections, FIG. 2.

Such plates are of similar construction to that described above, in connection with plates 30. However, the outwardly projecting ends are straight, rather than being inwardly offset.

Thus when the projecting ends are overlapped, the outwardly projecting straight ends of the two exterior plates 32a are received within the space provided by the offset portions of the outwardly projecting ends of plates 32.

Similarly, the outwardly projecting straight ends of innermost plates 32a are received within the recess provided by the offset outwardly projecting ends of the innermost companion plates 32. A flush profile thus is provided.

Plates 30, 32a further are provided with transverse openings 40 in their inner portions and transverse openings 42 in their outwardly extending portions.

Openings 40 register with openings 24 in the assembled condition of the truss, when load distributing pins 36 are inserted in the receiving openings 22.

Securing means are supplied for securing the plates to their respective structural members.

Most conveniently, the same securing means may be employed as interlock the rest of the truss components, i.e. a pin 44 which to all intents and purposes is identical with pins 18 previously described. It may be inserted through aligned openings 40 in the plates and openings 24 through the chord section pieces. It is held in place by means of press-on washers 46 which also may be similar to or identical with press-on washers 20, previously described.

Means also are provided for connecting the two adjacent ends of the upper chord components to each other in any one of a plurality of selected angular positions.

To this end there is provided a hinge pin or bolt 50 of sufficient length to extend through all of registering openings 42 of the projecting plate ends, as well as through the openings of central web members 14, which thus may be tied into the connecting assembly. Nuts 52 hold the bolt in place.

When assembled in the manner indicated in FIG. 2, the completed pitched truss achieves the objects of the invention in that it includes a strong ridge connection wherein the load is distributed over a wide area, and wherein both tension and compressive stresses are accommodated, wherein the pitch may be preformed to any desired angle. These advantages are achieved, furthermore, by the provision of a pitched truss which may be assembled easily and rapidly without difficult deviation from established manufacturing routines.

I claim:

1. A truss combination comprising
   (a) a lower chord,
   (b) a pitched upper chord including two sections arranged end to end at a predetermined angle to each other to form a central ridge,
   (c) a plurality of web members interconnecting the chords,
   (d) the adjacent ends of the two sections comprising the upper chord being spaced apart and having a predetermined pattern of pin openings transversely therethrough,
   (e) and a ridge connector comprising
      (1) a pair of separate structural plates each having on a side face thereof a predetermined pattern of laterally-extending spaced, load-distributing pins,
      (2) the pattern of the load-distributing pins being the same as the pattern of the pin openings through the chord sections,
      (3) the load distributing pins being dimensioned for reception in said pin openings,
      (4) the plates extending longitudinally beyond the ends of the upper chord sections into overlapped relation with each other when the load distributing pins of the plates are seated in the openings in the upper chord section ends,
      (5) plate securing means securing the plates to their respective upper chord section end, and
      (6) connecting means interconnecting the overlapped ends of the plates at a predetermined ridge angle of the upper chord sections.

2. In a pitched truss comprising a lower chord, a pitched upper chord including two sections arranged end to end at a predetermined angle to each other to form a central ridge, and a plurality of web members interconnecting the chords, the adjacent ends of the sections comprising the upper chord being spaced apart and having a predetermined pattern of pin openings transversely therethrough, a ridge connector comprising
   (a) a pair of separate structural plates each having on its side face a predetermined pattern of laterally-extending, spaced, load-distributing pins,
   (b) the pattern of the load-distributing pins being the same as the pattern of the pin openings through the chord sections,
   (c) the load-distributing pins being dimensioned for reception in said openings,
   (d) the plates being dimensioned to extend longitudinally beyond the ends of the upper chord sections into overlapped relation with each other when the load distributing pins of the plates are seated in the openings in the upper chord section ends,
   (e) plate securing means for securing the plates to their respective upper chord section ends, and
   (f) connecting means for interconnecting the overlapped ends of the plates at a predetermined ridge angle of the upper chord sections.

3. The ridge connector of claim 2 wherein each plate comprises a longitudinal body having longitudinally spaced lateral extensions on each side, both body and extensions bearing the load distributing pins in a widely dispersed pattern.

4. The ridge connector of claim 2 wherein the longitudinally extending ends of one of the plates is offset laterally toward the center of the chord sections on which it is mounted.

5. The ridge connector of claim 2 wherein there are two pairs of structural plates with the members of each pair being mounted face to face on the end of one of the chord sections.

6. The ridge connector of claim 2 wherein each of the chords includes two structural pieces placed side by side parallel to and spaced from each other and wherein there are four pairs of structural plates, one pair being mounted on the end of each of the pieces with the components of the plate pair being arranged face to face.

7. The ridge connector of claim 2 wherein the plate securing means comprises a securing pin pressed through registering openings through the inner ends of the plates and the upper chord sections and extending laterally outwardly from both sides of the sections, and washers pressed on the outwardly extending pin ends.

8. The ridge connector of claim 2 wherein the connecting means comprises hinge pin means interconnecting the overlapped ends of the plates.

References Cited

UNITED STATES PATENTS 2,638,637 5/1953 Kump _____ 52—690 X
3,281,168 10/1966 Dufficy _____ 52—642 X
3,285,636 11/1966 Hoyle _____ 52—642 X
3,414,300 12/1968 Spane _____ 287—20.92
3,457,689 7/1969 Troutner _____ 52—726 X PRICE C. FAW, JR., Primary Examiner U.S. Cl. X.R.

52—692, 693; 287—20.92